United States Patent [19]

Dasgupta et al.

[11] Patent Number: 5,498,489
[45] Date of Patent: Mar. 12, 1996

[54] RECHARGEABLE NON-AQUEOUS LITHIUM BATTERY HAVING STACKED ELECTROCHEMICAL CELLS

[76] Inventors: Sankar Dasgupta, c/o The Electrofuel Manufacturing Company Ltd. 21 Hanna Avenue, Toronto, Ontario, Canada, M6K 1W9; James K. Jacobs, 69 Albany Avenue, Toronto, Ontario, Canada

[21] Appl. No.: 421,935

[22] Filed: Apr. 14, 1995

[51] Int. Cl.⁶ .......................... H01M 10/38; H01M 2/12; H01M 4/70
[52] U.S. Cl. .......................... 424/152; 424/154; 424/160; 424/194; 424/197
[58] Field of Search .......................... 429/94, 152, 154, 429/160, 194, 197

[56] References Cited

U.S. PATENT DOCUMENTS

| | | | |
|---|---|---|---|
| 4,830,940 | 1/1986 | Keister et al. | 429/194 |
| 4,879,190 | 8/1988 | Lundsqaard | 429/94 |
| 5,300,373 | 9/1993 | Shackle | 429/152 |
| 5,352,547 | 8/1993 | Kita et al. | 429/194 |
| 5,352,548 | 6/1993 | Fujimoto et al. | 429/197 |
| 5,374,490 | 5/1993 | Aldecoa | 429/152 |

*Primary Examiner*—Stephen Kalafut
*Assistant Examiner*—Richard H. Lilley, Jr.

[57] ABSTRACT

A lithium battery constructed of lithium ion containing folded and stacked electrochemical cells is described, having a folded continuous, flexible lithium ion containing polymer laminate electrolyte sandwiched between first and second polarity lithium containing discrete electrode plates. The first and second polarity discrete electrode plates are carried, respectively, by first and second electrical current conducting flexible polymer laminates. The assembled polymer laminates are folded and stacked, connected to current collectors and packed into a lithium battery case.

15 Claims, 2 Drawing Sheets

RECHARGEABLE NON-AQUEOUS LITHIUM BATTERY HAVING STACKED ELECTROCHEMICAL CELLS

FIELD OF THE INVENTION

This invention is related to rechargeable electrochemical batteries, more particularly to rechargeable non-aqueous lithium ion containing batteries.

BACKGROUND OF THE INVENTION

Rechargeable lithium batteries are the result of recent advances in the field of electrochemical cells. The advantageous characteristics of such electrochemical cells include light weight, long service life, relatively high energy densities and high specific energies.

One particular group of conventional non-aqueous lithium ion batteries has a positive electrode having a metal oxide compound as the cathode active component, that readily reacts with lithium ions thus consuming electrons on discharge and releases lithium ions and electrons in the charging step. The negative electrode of this type of conventional non-aqueous lithium battery contains elemental lithium in some form, often intercalated in some kind of carbon. The lithium is ionised on discharge giving up an electron, while in the charging step lithium ions are intercalated in the carbon to form $Li_xC_6$, where $0<x<1$, consuming electrons. The electrolyte is conveniently an organic compound containing a lithium salt that readily dissociates yielding mobile lithium ions. The conventional electrolyte of a non-aqueous lithium battery is conductive only of lithium ions and not of electrons.

It may be assumed that the greater the area of contact between the respective electrode and the appropriate portion of the electrolyte, the higher is the current density that the battery is capable of generating. There are known methods for extending the contact areas of the respective electrode-electrolyte pair in a lithium battery. U.S. Pat. No. 5,352,548, issued to Fujimoto et al. on Oct. 4, 1994, describes a lithium ion containing electrochemical cell, in which the lithium-cobalt oxide containing positive electrode is carried on an aluminum foil and the negative electrode contains a graphite-polytetrafluoro-ethylene or graphite-polyvinylidene-fluoride mixture, carried on a thin copper plate. Between the electrodes is placed a porous polypropylene film impregnated with an organic solvent containing a lithium salt. The layered electrode-electrolyte-electrode structure is rolled into a coil and packed into a cylindrical battery container having electrical leads. It is to be noted that both the negative and the positive electrode mixtures require a binder to keep the particular electrode layer structurally stable, coherent and conductive. The smaller radii and tightly curving surface of the portions close to the central axis of the coil are likely to put substantial mechanical stress on the electrode layers resulting in reduced efficiency of such concentrically coiled electrochemical cells.

The non-aqueous lithium- battery described in U.S. Pat. No. 4,830,940, issued to Keister et al. on May 16, 1989, has a continuous, folded elemental lithium metal bearing, substantially rigid anode (negative electrode), and pellets of silver-vanadium oxide containing a binder, serving as cathode (positive electrode), sealed in a separator envelope located between the folds. The anode of U.S. Pat. No. 4,830,940 is constructed of a rigidly folded metallic mesh coated with a lithium foil on each of its faces, and enclosed in a polypropylene or polyethylene separator. The rigidly folded anode structure having pellets of cathodes between its folds, is immersed in an organic liquid electrolyte containing a lithium salt. It is noted that both the negative (anode) and the positive (cathode) active materials are enclosed in separator sheets and are not in direct contact with the electrolyte.

U.S. Pat. No. 5,300,373, issued to D. R. Shackle on Apr. 5, 1994, describes fan-folded, stacked electrochemical lithium cells. The battery of Shackle is made of an elongated laminate of one polarity electrode in continuous contact with a solid polymer electrolyte laminate. Both the electrode and the electrolyte laminates in continuous contact, are fan-folded and segments of the second polarity electrode are sandwiched between the folds. The various embodiments shown in U.S. Pat. No. 5,300,373 differ only in the manner the generated current is collected from the second polarity electrodes, however, all embodiments show folded double layers of the first polarity electrode and the electrolyte, the pair having similar widths. The first polarity electrode is carried as a continuous layer on a conductive web, hence it may be assumed that it contains a binder and has a definite thickness. The solid electrolyte laminate is also shown to have a definite thickness. One of the often experienced problems with fan-folding such double layered structures is that the pressure exerted on the inner folded layer at the highly curved corners results in what is known as "dog-bone" shaped distortions, causing the outer layer to be stretched over the "dog-bone" end. Such distortions lead to cracks, breaks, crumbling and similar manifestations of mechanical stress, all of which are likely to reduce the efficiency of performance and service life of the stacked battery. Thus lithium batteries made of conventional stacked electrochemical cells usually have weak areas at the high curvature bends of the folds. Furthermore, in some of the embodiments described in U.S. Pat. No. 5,300,373 issued to Shackle, the second electrode segments are only in edge contact with the current collector, hence a small movement during packing or use of the stacked cells may result in rendering some of the second polarity electrode segments malfunctional. Another difficulty which may arise due to the continuous first polarity electrode having the same width as the solid polymer electrolyte, is that the second polarity electrode or its current collector may come into direct contact with the first polarity electrode, thereby short circuiting the folded cell.

There is a need for an improved rechargeable non-aqueous lithium battery made of stacked folded electrochemical cells, that overcomes the above problems.

SUMMARY OF THE INVENTION

An improved lithium battery has now been constructed of a multiplicity of lithium containing stacked electrochemical cells packed in a battery case, the electrochemical cells having a continuous, flexible, mobile lithium ion containing polymer laminate electrolyte, discrete first and second polarity electrodes carried by respective, continuous, flexible first and second polarity electrode support laminates in contact with first and second polarity electrode current collectors. The assembled laminates making up the stacked electrochemical cells are comprised of a first electrical current conducting continuous, flexible, foldable electrode support laminate having first and second faces and having a multiplicity of discrete first polarity electrode plates affixed by one of the major sides of each first polarity electrode, to the first face of the electrode support laminate at predetermined spaced intervals. The unattached opposing major side of each of the discrete first polarity electrode plates is in contact with the first face of a continuous, flexible, foldable mobile lithium ion containing polymer laminate electrolyte also comprised in the folded laminates. The lithium ion containing polymer laminate electrolyte is non-conductive of electrons. The third laminate comprised in the folded laminates is a second electrical current conducting continuous, flexible, foldable electrode support laminate having a multiplicity of discrete second polarity electrode plates affixed by means of one of their major sides, to its first face at substantially the same predetermined spaced intervals as the first polarity electrode plates are affixed to the first electrical current conducting, continuous, flexible, foldable electrode support laminate. The other major side of each discrete second polarity electrode plate is in contact with the second face of the continuous, flexible, foldable mobile lithium ion containing polymer laminate electrolyte, such that each discrete first polarity electrode plate corresponds to a discrete second polarity electrode plate appropriately placed. The first electrical current conducting, continuous, flexible, foldable electrode support laminate bearing discrete first polarity electrode plates, the second electrical current conducting, continuous, flexible, foldable electrode support laminate bearing discrete second polarity electrode plates and the continuous, flexible, foldable mobile lithium ion containing polymer laminate electrolyte located between the first and the second electrical current conducting, continuous, flexible, foldable electrode support laminates, are fan-folded such that they form stacked folded parallel sections and discrete first and second polarity electrode plates between the folds, and flexible elbow sections which are devoid of first and second polarity electrode plates, thereby forming a multiplicity of stacked lithium containing electrochemical cells. A first polarity electrode current collector is placed in contact with the first electrical current conducting, continuous, flexible, foldable electrode support laminate and a second polarity electrode current collector is placed in contact with the second electrical current conducting, continuous, flexible, foldable electrode support laminate, and the stacked, fan-folded lithium ion containing electrochemical cells are packed in a battery case having electrical leads.

In a second embodiment of the present invention, the widths of the continuous, flexible, foldable lithium ion containing polymer laminate electrolyte is extended to have continuous, flexible, foldable edge portions, and the edge portions of the laminate contain no mobile lithium ions.

Figure 1:
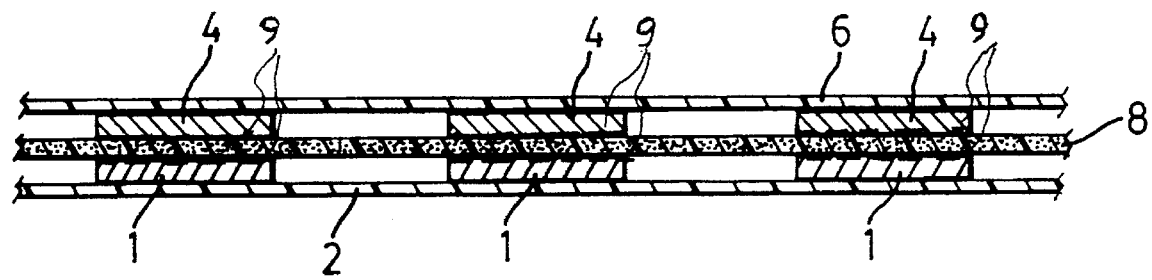
FIG. 1 is a schematic drawing of the assembled, unfolded laminates having discrete first and second polarity electrodes affixed to the respective faces.

The preferred embodiments of the invention will be described hereinbelow and illustrated by working examples.

DETAILED DESCRIPTION OF THE PREFERRED EMBODIMENTS

As briefly mentioned above the current density that a rechargeable lithium ion battery is capable of generating is proportional to the areas of contact between the face of the positive electrode and the electrolyte, and the respective face of the negative electrode and the electrolyte. In the present rechargeable non-aqueous lithium ion battery an elongated, flexible and mobile lithium ion containing solid polymer electrolyte, having a convenient length and width, is utilized. Mobile lithium ion is understood to mean that the lithium is present in the polymer electrolyte as a lithium salt or a lithium compound capable of dissociating to provide lithium ions. The lithium compound may be a lithium bearing organic ligand of the polymer comprised by the electrolyte. The lithium salt may be any lithium salt that is soluble in the polymer, and is capable of releasing mobile lithium ions by dissociation.

Another form of solid polymer electrolyte that may be used in obtaining stacked lithium ion containing cells is a microporous polymer laminate which has been impregnated with an organic liquid containing mobile lithium ions. Conveniently, a lithium salt is dissolved in the organic liquid in an appropriate concentration before the microporous polymer laminate is impregnated with the organic liquid.

The solid polymer laminate electrolyte may contain polyethylene oxide, polypropylene oxide, polyvinylidene fluoride or any similar conventional substance in which the appropriate lithium salt has been dissolved prior to laminating. The lithium salt may be $LiPF_6$, $LiBF_6$, $LiAsF_6$, $LiClO_4$, lithium triflate ($LiCF_3SO_3$) or any similar lithium compound soluble in the polymer that is capable of yielding lithium ions by dissociation. The microporous polymer laminate may be made of polyethylene, polypropylene or similar relatively inert substance, which is subsequently impregnated with a lithium ion containing organic liquid. The organic liquid is commonly ethylene carbonate or propylene carbonate or mixture of these, or a chemical equivalent, containing any of the above listed lithium compounds or known derivatives of them. The width and length of the laminate is dictated by convenience. The thickness of the laminate is conveniently less than 1 mm, and usually between 0.04 and 0.4 mm. For the sake of clarity, the continuous, flexible, foldable lithium ion containing polymer laminate electrolyte referred to may be any one of the following: a solid polymer laminate containing a lithium salt dissolved therein or having a mobile lithium ion bearing ligand, a microporous polymer laminate impregnated with an organic liquid containing a lithium compound capable of yielding lithium ions by dissociation, and a laminated mixture of an insulating organic polymer and a mobile lithium ion containing organic polymer. A separate organic polymer separator laminate may also be placed next to one face of the polymer laminate electrolyte, if so desired.

The negative electrode is usually elemental lithium intercalated in a conventional form of carbon of small particle size. Graphite, petroleum coke, fine charcoal and similar fine free carbon containing substances are commonly utilized. The small particles of carbon, referred to as fine carbon in subsequent discussions, are usually mixed with an organic binder and optionally with a lithium salt, and the mixture is then cast or moulded into thin squares or rectangular plates of convenient dimensions. The plate width is preferably exceeded by the width of the polymer laminate electrolyte discussed above by an amount which is not less than half the plate thickness. Thin sheets of elemental lithium or alloys of lithium may also be used as anode active material, which have been mounted on a continuous carbon carrier strip.

The positive electrode or cathode contains conveniently a transition metal oxide which is capable of incorporating lithium ions in its structure. Oxides which may serve as cathode active materials include cobalt oxide, vanadium oxide, manganese oxide, silver vanadate, tungsten oxide and such like. It is preferred that some lithium is incorporated in the structure of the transition metal oxide for use as cathode, which is often referred to as lithiated transition metal oxide compound. The cathode active material is mixed with a suitable organic binder. Optionally some fine carbon is added to increase the conductivity of the mixture. The positive electrode mixture is subsequently cast into thin squares or rectangular plates. Preferably the positive electrode plates have the same shape, width and length as the negative electrode.

It is not necessary, that the negative electrode plates and the positive electrode plates have the same thickness, but the thickness of the plates seldom exceeds 2 mm and is dictated by convenience. Usually, but not necessarily, the elemental lithium containing electrode is thinner than the lithiated transition metal oxide compound containing electrode. It is preferred that the width of the lithium ion containing polymer laminate electrolyte exceeds the platewidths by not less than half the thickness of the thinner of the electrode plates.

The lithium ion battery assembled of stacked electrochemical cells described in the present invention has electrically conductive, continuous, flexible, foldable electrode support laminates on which the discrete electrode plates are mounted. The electrically conductive, continuous, foldable, flexible electrode support laminate may be made of a polymer laminate which contains and carries laminated into it, fine particles of a conductive substance, such as fine carbon or graphite, titanium nitride and zirconium nitride. Such electrically conductive polymer laminates are described in our co-pending application Ser. No.: 08/204,439, filed on Mar. 2, 1994. However, other suitable, corrosion resistant, electrically conductive, continuous, flexible, foldable electrode support laminates may also be utilized. The negative electrode plates are mounted on one face of an electrically conductive, continuous, flexible, foldable polymer laminate affixed with a suitable substance, for example, with the binder utilized in the electrode mixture, at spaced intervals. The spacing of the electrode plates is governed by the size of the lithium battery to be constructed. Similarly, the positive electrode plates are mounted on one face of another, usually similar, electrically conductive, continuous, flexible, foldable polymer laminate and affixed with an adhesive substance such as the electrode plate binder, preferably at similar spaced intervals. The width of the electrically conductive, continuous, flexible, foldable polymer laminates utilized in the present invention may be the same or less than the width of the lithium containing solid polymer laminate electrolyte, however, the width of the electrically conductive polymer laminate utilized for supporting the electrodes, is the same or may be slightly exceeded by the platewidth of the affixed electrode plates. It is noted, that the electrode plates are affixed to the electric current conducting continuous, flexible, foldable electrode support laminates in a manner that allows electric charge, that is electrons, to travel freely between the electrode plates and the electrode support laminates.

The unattached side of each discrete negative electrode plate is subsequently brought into contact with one face of the lithium containing solid polymer laminate electrolyte discussed hereinabove, and the unattached side of each discrete positive electrode plate is brought into contact with the other face of the lithium containing solid polymer laminate electrolyte. For the sake of clarity, bringing into contact in the present invention is understood to mean that the electrode plates are in ionically conductive contact with the respective face of the solid polymer laminate electrolyte, that is mobile lithium ions are able to move from the laminate electrolyte to the electrode plates, and vice versa. It is convenient, but not necessary for the working of the present invention, to utilize a lithium ion containing adhesive coating between the electrode plates in contact with the respective face of the solid polymer laminate electrolyte. Conveniently, the concentration of the lithium ion in the adhesive coating layer is less than the lithium ion concentration in the solid polymer laminate electrolyte. Such lithium ion containing adhesive coatings are described in our co-pending patent application, Ser. No.: 08/332,796, filed Nov. 2, 1994.

The assembled laminates are shown schematically on FIG. 1, wherein reference numeral 1 represents the negative electrode plates affixed to the negative electrode support laminate 2, reference numeral 4 represents the positive electrode plates affixed to the positive electrode support laminate 6. The opposing unattached sides of the electrode plates are in contact with the respective face of the lithium containing solid polymer laminate electrolyte 8. Alternatively, as discussed above, the solid polymer laminate electrolyte is replaced by a microporous polymer laminate impregnated with a lithium ion containing organic liquid. Optionally, a lithium ion containing adhesive coating layer 9, is applied between the electrode plate and the face of the polymer laminate electrolyte. The laminates are assembled such that one set of one polarity electrodes corresponds to another set of the opposite polarity electrodes, thus making up a series of separate electrochemical cells composed of a pair of opposite polarity electrode plates and electrolyte laminate sandwiched between the electrode plates. The length of the electrode plates is conveninently slightly less than the length of the lithium battery case to be utilized. The space between two adjacently mounted electrode plates is such that it allows folding of the laminates together with the discrete electrode plates located between them without forming creases or bulges in the laminates.

Figure 2:
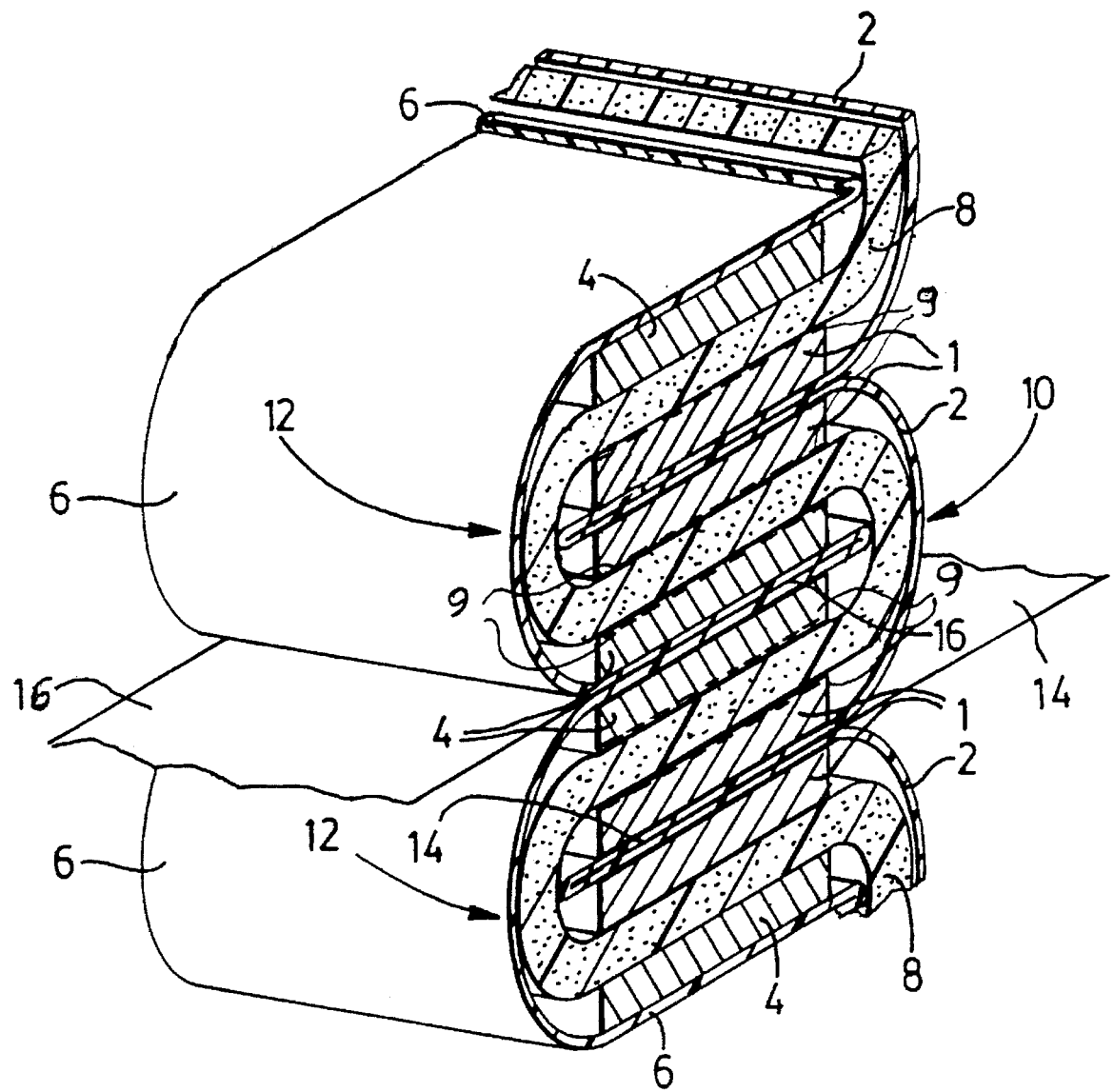
FIG. 2 is a schematic drawing of a stacked, fan-folded section of the lithium ion containing electrochemical cells of the present invention.

The assembled laminates, having discrete positive and negative electrode plates located between them at spaced intervals, are subsequently fan-folded to make up several stacked lithium ion based electrochemical cells in a manner shown schematically on FIG. 2. Like numerals of FIG. 2 represent like items of FIG. 1. The electrochemical cells stacked as shown have parallel sections and flexible elbow sections, the latter are denoted by reference numerals 10 and 12, on each side of the cell stack. The flexible elbow sections are devoid of electrode plates. The current generated by the stacked electrochemical cells is conveniently collected by elongated tabs of metallic foil 14 and 16, placed between the parallel sections in a conventional manner; 14 represents the first polarity current collector and 16 represents the second polarity current collector. The metallic current collectors may also be used for recharging the lithium battery. Other known methods for electrically connecting the current collectors with the respective current conducting electrode support laminate may also be utilized.

The stacked electrochemical cells constructed of folded elongated laminates and discrete positive and negative electrode plates located between them, are packed in a conventional container or case to form a lithium battery. The metallic current collectors are connected in the usual manner to external lead wires for drawing electrical current when the battery is discharging, and for recharging the battery when required. The stacked lithium ion based electrochemical cells packed in a container are protected from atmospheric moisture and corrosion in a known manner.

Figure 3:
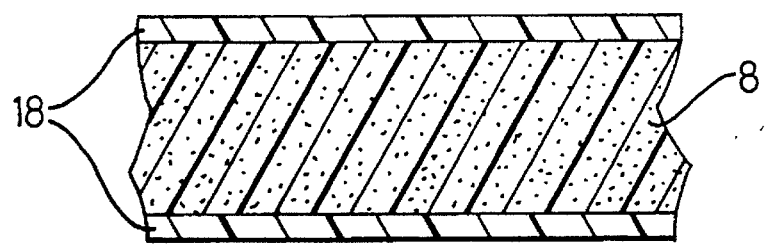
FIG. 3 shows a lithium containing polymer electrolyte laminate segment having edge portions devoid of lithium ions.

In another embodiment of the present invention, the width of the solid polymer laminate electrolyte is extended by a polymer strip attached to one, preferably to both edges of the lithium containing polymer laminate electrolyte. The polymer strip attached to the polymer laminate electrolyte does not contain any mobile lithium ions nor is it electrically conductive, hence it is capable of acting as a separator between the edges of the discrete positive and negative electrode plates within the stacked folds of the lithium ion battery of the present invention. FIG. 3 depicts schematically a section of the polymer laminate electrolyte 8, having polymer strips 18 attached to each of its two parallel edges.

As discussed above, the lithium containing solid polymer laminate electrolyte utilized as the central laminate of the lithium based stacked electrochemical cells may be replaced by a microporous polymer laminate impregnated with a lithium ion containing organic liquid. In the second embodiment of the invention the portions bordering the edges of the microporous polymer laminate along the length of the microporous polymer is not impregnated with the lithium ion containing organic liquid, thus the edge portions will be devoid of lithium ions and be able to act as separators between the edges of the discrete positive and negative electrode plates located in the folds.

The folded assembled laminates forming stacked electrochemical cells, are then packed in an appropriate container or casing, which is equipped with conventional electrical lead connection means to provide a lithium ion battery with positive and negative leads. The leads are designed to permit the battery to be charged and generate power when discharged.

EXAMPLE 1

A commercially available co-polymerized polyvinylidene fluoride (PVDF) based laminate having $LiPF_6$ dissolved in the polymer in 1 Molar concentration prior to lamination and the usual plasticising agents, was cut in an appropriate length to assemble 33 stacked 6×4 inch folds in a lithium ion battery. The width of the PVDF based polymer laminate was 4 inches (10 cm) and the thickness of the laminate was 2.4 thou (0.06 mm= 60 µm). A mixture containing 90 wt. % petroleum coke, 5 wt. % $LiPF_6$ and 5 wt. % polyvinylidene flouride binder was extruded into plates having dimensions 3.8×5.6 inches (95×140 mm) and thickness of 18 thou (450 µm), the plates were to be utilized as anode plates in the stacked lithium battery.

Fine lithium cobalt oxide ($Li_xCoO_2$ where $0<x<1$), having an average particle size of about 5 µm was mixed with 5 wt. % polyvinylidene fluoride and the plastic mixture was subsequently extruded into 3.8×5.6 inch (95×140 mm) rectangular plates having 8 thou (200 µm) thickness. The lithiated cobalt oxide containing plates were to be utilized as cathode plates in the stacked electrochemical cells making up the lithium battery described above.

Polyethylene containing conventional plasticizers was mixed with fine carbon having average particle size of 0.5 µm, to contain 45 vol. % carbon, and the resulting dough was laminated to 0.8 thou (20 µm) thickness. The width of the carbon containing polyethylene laminate was 4 inches (10 cm). A length corresponding to the length of the polyvinylidene fluoride based electrolyte laminate referred to above, was cut from the carbon containing polyethylene laminate and the anode plates were affixed lengthwise to one face of the laminate with ethylene carbonate, the plates being spaced to have 0.4 inch (1 cm) gaps between them. A second polyethylene laminate having similar length was utilized as the positive electrode support laminate and the positive electrode plates containing lithiated cobalt oxide were affixed to one of its faces with ethylene carbonate in a similar manner, the positive electrode plates being spaced at the same intervals as the negative electrode plates. The free rectangular faces of the positive and negative electrode plates were subsequently coated with an ethylene carbonate-propylene carbonate paste containing $LiPF_6$ in 0.5 Molar concentration. The laminates were assembled as shown on FIG. 1, the coated sides of the electrode plates being brought in contact with appropriate faces of the polyvinylidene laminate, thus forming electrochemical cell sections made of positive and negative electrode plates in contact with appropriate faces of a continuous lithium ion containing polyvinylidene fluoride based laminate and the electrode plates being supported on carbon containing polyethylene laminates. The assembled laminates were fan-folded in a zig-zag pattern as shown on FIG. 2, to have 33 folds. A 20 µm thick copper foil was placed between the folds of the negative electrode plate support polymer laminate and an aluminum foil of similar thickness was placed between the folds of the positive electrode support polymer laminate in a manner shown schematically on FIG. 2. The total thickness of the folded laminates bearing electrode plates was about 1 inch. The stacked folded assembled laminates were packaged and sealed in a known manner and enclosed in a protective casing having appropriate electrical leads.

The lithium battery made of stacked folded electrochemical cells as described above, was charged by applying 4.2 volts at its terminals until a steady battery power of 4.0 volts was attained. The fully charged lithium battery pack was found to deliver an average discharge voltage of 3.2 volts. The specific energy generated by the lithium battery pack was measured to be 103 watt.hour per kg, and the energy density of the lithium battery pack made in accordance with the present invention was found to be 237 watt.hour per liter.

EXAMPLE 2

An 1 inch wide microporous polyethylene based polymer laminate, which is marketed under the name of "Cellgard" was impregnated with an organic liquid containing ethylene carbonate and propylene carbonate in 1:1 ratio and $LiClO_4$ in 1 Molar concentration. A length was cut of the impregnated microporous laminate to make 10 folds, each fold accommodating 0.95 by 0.95 inch electrode plates.

The petroleum coke-based anode mixture was made of fine coke particles, 5 wt % lithium perchlorate and polyvinylidene fluoride binder and extruded in a manner similar to that described in Example 1, and the cathode mixture contained lithiated cobalt oxide similar to Example 1, the electrode plates of the lithium battery pack of Example 2 had dimensions of 0.95 by 0.95 inch square. The thickness of the petroleum coke-based negative electrode plates was 18 thou (450 µm) and that of the $LiCoO_2$-based positive electrode plate was 8 thou (200 µm), respectively, as in Example 1.

The electrode plates were affixed to 1 inch wide 45 vol. % carbon loaded polyethylene laminates in a manner similar to that described in Example 1, thus providing a set of negative electrode plates supported on a conductive carbon containing polymer laminate and another set of positive electrode plates supported on another conductive carbon containing polymer laminate. The lithium ion containing microporous polymer laminate and the laminates bearing the electrode plates were assembled and folded, as respectively shown on FIGS. 1 and 2. The lithium battery made of 10 folded and stacked electrochemical cells was sealed and packaged as described in Example 1.

The lithium battery composed of 10 stacked 1 inch square cells was subsequently charged as in Example 1. The fully charged battery was found to exhibit an open circuit voltage of 3.8 volts. The average discharge voltage was 3.12 volts. The lithium ion-based stacked, folded electrochemical cell assembly gave specific energy at the rate of 95 watt.hour/kg and energy density at the rate of 200 watt.hour/liter.

The foregoing has described the principles, preferred embodiments and modes of operation of the present invention. However, the invention should not be construed as limited to the particular embodiments discussed. Instead, the abovedescribed embodiments should be regarded as illustrative rather than restrictive, and it should be appreciated that variations may be made in those embodiments by workers skilled in the art without departing from the scope of the present invention as defined by the following claims.

We claim:

1. In a lithium battery constructed of a multiplicity of lithium containing stacked electrochemical cells packed in a battery case, the stacked electrochemical cells having a continuous, flexible, folded, mobile lithium ion containing polymer electrolyte, first and second polarity electrodes, and first and second polarity electrode current collectors, the improvement comprising that the stacked electrochemical cells are assembled of laminates consisting of:

i) a first electrical current conducting continuous, flexible, foldable electrode support laminate having first and second faces, a multiplicity of discrete first polarity electrode plates, each first polarity electrode plate having opposing major sides, a platelength and a first platewidth, one of the major sides of each of said discrete first polarity electrode plates being conductively affixed to said first face of said first electrical current conducting continuous, flexible, foldable electrode support laminate at spaced intervals predetermined by said platelength, ii) a continuous, flexible, foldable mobile lithium ion containing polymer laminate electrolyte having first and second faces, a laminate width and a pair of laminate edges, said continuous, flexible, foldable polymer laminate electrolyte being conductive of lithium ions and non-conductive of electrical current, iii) a second electrical current conducting continuous, flexible, foldable electrode support laminate having first and second faces, a multiplicity of discrete second polarity electrode plates, each second polarity electrode plate having opposing major sides, a platelength that is similar to the platelength of said first polarity electrode plates, and a second platewidth, one of the major sides of each of said discrete second polarity electrode plates being conductively affixed to said first face of said second electrical current conducting continuous, flexible, foldable electrode support laminate at said predetermined spaced intervals; the other of said opposing major sides of said discrete first polarity electrode plates being in contact with said first face of said continuous, flexible, foldable mobile lithium ion containing polymer laminate electrolyte at said predetermined spaced intervals, and the other of said opposing major sides of said discrete second polarity electrode plates being in contact with said second face of said continuous, flexible, foldable mobile lithium ion containing polymer laminate electrolyte at said predetermined spaced intervals, said major side of each of said discrete first polarity electrode plates contacting said first face of said polymer laminate electrolyte corresponding to the respective major side of one of said discrete second polarity electrode plates contacting said second face of said polymer laminate electrolyte;

said assembled laminates being fan-folded such that they comprise stacked parallel sections enfolding said discrete first and second polarity electrode plates, and flexible elbow sections devoid of discrete first and second polarity electrode plates, thereby providing a multiplicity of lithium containing folded and stacked electrochemical cells;

a first polarity electrode current collector in electrical contact with said first electrical current conducting continuous, flexible, foldable electrode support laminate;

a second polarity electrode current collector in electrical contact with said second electrical current conducting continuous, flexible, foldable electrode support laminate; and a battery case having electrical leads containing said fan-folded stack of electrochemical cells.

2. A lithium battery constructed of a multiplicity of lithium containing stacked electrochemical cells packed in a battery case as claimed in claim 1, having discrete first polarity electrode plates comprising carbon having particle size less than 1 µm, a mobile lithium ion containing salt, said carbon being capable of intercalating said mobile lithium ion, and an organic binder.

3. A lithium battery constructed of a multiplicity of lithium containing stacked electrochemical cells packed in a battery case, as claimed in claim 1, having discrete second polarity electrode plates comprising a lithiated transition metal oxide compound, said transition metal being selected from the group consisting of manganese, vanadium, cobalt, nickel, tungsten and alloys of silver-vanadium, said transition metal oxide compound being capable of incorporating lithium ions in its structure, and an organic binder.

4. A lithium battery constructed of a multiplicity of lithium containing stacked electrochemical cells packed in a battery case as claimed in claim 1, wherein said laminate width of said continuous, flexible, foldable mobile lithium ion containing polymer laminate electrolyte exceeds the greater one of said first and said second platewidths.

5. A lithium battery constructed of a multiplicity of lithium containing stacked electrochemical cells packed in a battery case as claimed in claim 1, wherein said first platewidth is said first platewidth is the same as said second plate width the same as said second platewidth and said laminate width of said continuous, flexible, foldable mobile lithium ion containing polymer laminate electrolyte exceeds said first platewidth.

6. A lithium battery constructed of a multiplicity of lithium containing stacked electrochemical cells packed in a battery case as claimed in claim 1, wherein said continuous, flexible, foldable mobile lithium ion containing polymer laminate electrolyte is comprising an organic polymer compound containing a lithium salt dissolved therein in a first concentration, said lithium salt being capable of yielding mobile lithium ions.

7. A lithium battery constructed of a multiplicity of lithium containing stacked electrochemical cells packed in a battery case as claimed in claim 6, wherein said continuous, flexible, foldable mobile lithium ion containing polymer laminate electrolyte has a polymer laminate strip appended to one of said laminate edges, said polymer laminate strip essentially consisting of said organic polymer compound comprised in said polymer laminate electrolyte, said polymer laminate strip extending said laminate width.

8. A lithium battery constructed of a multiplicity of lithium containing stacked electrochemical cells packed in a battery case as claimed in claim 1, wherein said continuous, flexible, foldable mobile lithium ion containing polymer laminate electrolyte is comprising a continuous, flexible, foldable microporous polymer laminate impregnated with a mobile lithium ion containing organic liquid, said lithium ion being contained in said organic liquid in a second concentration.

9. A lithium battery constructed of a multiplicity of lithium containing stacked electrochemical cells packed in a battery case as claimed in claim 8, wherein said impregnated continuous, flexible, foldable microporous polymer laminate has edge portions made of unimpregnated continuous, flexible, foldable microporous polymer laminate, and said edge portions are extending said microporous polymer laminate width.

10. A lithium battery constructed of a multiplicity of lithium containing stacked electrochemical cells packed in a battery case as claimed in claim 6, having a lithium ion containing adhesive coating layer between one of said faces of said continuous, flexible, foldable mobile lithium ion containing polymer laminate electrolyte and the other of the opposing major sides of at least one of said discrete electrode plates, and the concentration of the lithium ion in said adhesive coating layer is less than said first concentration of the lithium salt dissolved in said continuous, flexible, foldable mobile lithium ion containing polymer laminate electrolyte.

11. A lithium battery constructed of a multiplicity of lithium containing stacked electrochemical cells packed in a battery case as claimed in claim 8, having a lithium ion containing adhesive coating layer between one of said faces of said continuous, flexible, foldable microporous polymer laminate impregnated with a mobile lithium ion containing organic liquid, and the other of the opposing major sides of at least one of said discrete electrode plates, and the concentration of the lithium ion in said adhesive coating layer is less than said second concentration of lithium ions contained in said organic liquid impregnating said continuous, flexible, foldable microporous polymer laminate.

12. A lithium battery constructed of a multiplicity of lithium containing stacked electrochemical cells packed in a battery case as claimed in claim 1, wherein said first electrical current conducting continuous, flexible, foldable electrode support laminate comprises electrically conductive particles selected from the group consisting of carbon having particle size less than 1 μm, graphite, titanium nitride and zirconium nitride, embedded in a continuous, flexible, foldable polymer laminate.

13. A lithium battery constructed of a multiplicity of lithium containing stacked electrochemical cells packed in a battery case as claimed in claim 1, wherein said second electrical current conducting continuous, flexible, foldable electrode support laminate comprises electrically conductive particles selected from the group consisting of carbon having particle size less than 1 μm, graphite, titanium nitride and zirconium nitride, embedded in a continuous, flexible, foldable polymer laminate.

14. A lithium battery constructed of a multiplicity of lithium containing stacked electrochemical cells packed in a battery case as claimed in claim 1, wherein said first electrical current conducting continuous, flexible, foldable electrode support laminate comprises an elongated metal foil, said metal being selected from the group consisting of aluminum, alloys of aluminum, copper and alloys of copper, and said elongated metal foil is adherently mounted on one face of a continuous, flexible, foldable polymer laminate.

15. A lithium battery constructed of a multiplicity of lithium containing stacked electrochemical cells packed in a battery case as claimed in claim 1, wherein said second electrical current conducting continuous, flexible, foldable electrode support laminate comprises an elongated metal foil, said metal being selected from the group consisting of aluminum, alloys of aluminum, copper and alloys of copper, and said elongated metal foil is adherently mounted on one face of a continuous, flexible, foldable polymer laminate.

\* \* \* \* \*